United States Patent [19]

Yamada et al.

[11] Patent Number: 5,366,542
[45] Date of Patent: Nov. 22, 1994

[54] POLISHING COMPOSITION

[75] Inventors: Tsutomu Yamada, Machida; Taizo Okajima, Kitakyushu; Kouichi Ootani, Nougata; Hitoshi Morinaga, Kitakyushu, all of Japan

[73] Assignee: Fujimi Incorporated, Aichi, Japan

[21] Appl. No.: 988,360

[22] Filed: Dec. 7, 1992

Related U.S. Application Data

[63] Continuation of Ser. No. 748,809, Aug. 22, 1991, abandoned.

[30] Foreign Application Priority Data

Aug. 29, 1990 [JP]  Japan .................................. 2-227580
Mar. 18, 1991 [JP]  Japan .................................. 3-052750

[51] Int. Cl.$^5$ ................................................ C09G 1/00
[52] U.S. Cl. ............................................ 106/3; 51/309
[58] Field of Search ............................... 106/3; 51/309

[56] References Cited

U.S. PATENT DOCUMENTS

| | | | |
|---|---|---|---|
| 4,225,349 | 9/1980 | Koshiyama et al. | 106/3 |
| 4,475,981 | 10/1984 | Rea | 156/636 |
| 4,581,042 | 4/1986 | Willmore | 51/293 |
| 4,705,566 | 11/1987 | Senda et al. | 106/3 |
| 4,915,710 | 4/1990 | Miyazaki et al. | 51/309 |
| 4,935,039 | 6/1990 | Miyazaki et al. | 501/309 |
| 4,956,015 | 9/1990 | Okajima et al. | 106/3 |
| 5,084,071 | 1/1992 | Nenadic et al. | 51/309 |
| 5,139,570 | 8/1992 | Castrogiovanni et al. | 106/3 |

*Primary Examiner*—Paul Lieberman
*Assistant Examiner*—Margaret Einsmann
*Attorney, Agent, or Firm*—Oblon, Spivak, McClelland, Maier & Neustadt

[57] ABSTRACT

The present invention relates to a polishing composition comprising water, alumina, and a chelating agent. It may optionally be incorporated with an aluminum salt and/or boehmite. The present composition permits efficient polishing and gives a polished surface having superior surface properties. The composition is suitable for polishing a memory hard disk.

14 Claims, No Drawings

POLISHING COMPOSITION

This application is a continuation of application Ser. No. 07/748,809, filed on Aug. 22, 1991, now abandoned.

The present invention relates to a polishing composition. More particularly, it relates to a polishing composition capable of polishing such as a metal, a synthetic resin or glass with high polishing efficiency to provide an excellent polished surface. The polishing composition of the present invention is useful particularly for polishing a metal surface such as a memory hard disk surface.

In the precision polishing of materials such as silicon or other semiconductor substrates, various magnetic memory hard disks or laser parts, the production on an industrial scale of which has been remarkably increased during the past ten years, the level of requirement for the surface smoothness and defectlessness (freehess from defects such as scratch marks, orange peel, pits, nodules or cracks) of the polished surface, has become very high as compared with the level of polishing technique in the past. Further, a large amount of investment is required for installations and facilities for the production and inspection, and it has become important to reduce costs by improving the production speed and by reducing defective products. Accordingly, with respect to the polishing agents to be used in these fields, it has been strongly desired to improve the polishing rate as well as the polishing precision.

As a polishing agent, a composition having alumina dispersed in water, has been used. However, such a polishing agent is inadequate in the polishing rate. If the particle size of alumina is increased to improve the polishing rate, the polished surface tends to be roughened. Therefore, it has been difficult to satisfy the polishing rate and the surface condition simultaneously.

Japanese Unexamined Patent Publication No. 89389/1979 proposes to employ, as alumina, calcined alumina obtained by calcining boehmite at a high temperature. Further, it proposes to improve the polishing performance by adding an aluminum compound such as aluminum nitrate or aluminum polychloride as a polishing accelerator to a slurry comprising calcined alumina and water. Japanese Unexamined Patent Publication No. 25187/1987 proposes to use such a composition for polishing a memory hard disk.

Some of the present inventors have found that when boehmite is incorporated to a polishing composition comprising water and α-alumina, the polishing rate can be improved without reducing the polish finishing effects such as the smoothness of the polished surface or the prevention of formation of surface defects. (See U.S. Pat. No. 4,956,015) It has also been reported that additives which increase the polishing rate and improve the polishing precision include nickel sulfate, aluminum oxalate, ammonium sulfate, and metal nitrite.

An object of the present invention is also to provide a polishing composition which permits polishing rate and gives a good polished surface. In search of a polishing composition which achieves the above-mentioned object, the present inventors carried out a series of researches, which led to a finding that it is possible to improve the polishing composition composed of water and alumina in polishing performance and polishing rate if it is incorporated with a chelating agent alone or in combination with a certain kind of compound.

The present invention is to provide a polishing composition which comprises water, alumina, and a chelating agent.

The present invention is also to provide a polishing composition which comprises water, alumina, a chelating agent, an aluminum salt and, or boehmite.

Now, the present invention will be described in detail with reference to the preferred embodiments.

There is no particular restriction as to alumina to be used in the present invention and alumina includes γ-alumina, θ-alumina, α-alumina and the like. It is desirable to use α-alumina from the standpoint of polishing rate, when polishing a memory hard disk. α-alumina is obtained by calcining aluminum hydroxide such as bayerite, gibbsite or hydrargillite, or an alumina other than α-alumina such as boehmite, γ-alumina or θ-alumina, at a temperature of at least 1,100° C.

In consideration of the polishing precision and polishing rate, the alumina is a fine powder usually having an average particle size of from 0.1 to 10 μm, preferably from 0.1 to 3 μm, and having a maximum particle size of at most 30 μm, preferably at most 20 μm.

The amount of the alumina is usually from 1 to 30% by weight, preferably from 2 to 15% by weight, based on the total amount of the polishing composition. If the amount of the alumina is too small, the polishing rate becomes small, and if it is too large, it becomes difficult to maintain a uniform dispersion and the handling becomes difficult due to an excessive increase of the viscosity of the slurry.

The chelating agent to be used in the present invention is a compound which has a multidentate ligand to form a chelate compound with a metal ion. Water soluble chelating agent is generally used in the present invention, and among them preferable one is a polyamine or polyaminocarboxylic acid, with the latter being desirable. Examples of the polyamine include ethylenediamine, 2,2'-bipyridine, and diethylenetriamine. Examples of the polyaminocarboxylic acid include nitrilotriacetic acid, ethylenediaminetetraacetic acid, and diethylenetriaminepentaacetic acid, and sodium or potassium salts thereof. The amount of the chelating agent is from 0.01 to 20% by weight, preferably 0.1 to 10% by weight, based on the total amount of the composition, and 0.5 to 50% by weight based on the amount of alumina. With an excessively small amount, the chelating agent does not produce the intend effect of the invention; and with an excessively large amount, the chelating agent is wasteful without any additional effect. It is considered that the chelating agent affects the dispersion of alumina in the polishing composition in such a manner as to improve the polishing performance.

The polishing composition of the present invention may further be incorporated with an aluminum salt to increase the polishing rate. Examples of the aluminum compound include aluminum sulfate, aluminum chloride, aluminum nitrate, aluminum hydrogen phosphate, and aluminum bromide. The aluminum salt may be either hydrous or anhydrous. Instead of using aluminum salt, a combination of an aluminum compound and an acid which react with each other to form the desired aluminum salt may be used. The amount of the aluminum salt (as anhydrous form) is from 0.01 to 20% by weight, preferably 0.1–10% by weight, based on the total amount of the polishing composition, and 0.5–50% by weight based on the amount of alumina. With an excessively small amount of aluminum salt does not increase the polishing rate; and with an excessively large amount, aluminum salt is wasteful without any additional effect.

The polishing composition of the present invention may be incorporated with boehmite to enhance its effect. Boehmite is a kind of alumina hydrate represented by the formula of AlOOH or $Al_2O_3 \cdot H_2O$, and is prepared by hydrothermal reaction of gibbsite at about 250° C. under pressure or by hydrolyzing an organoaluminum compound $[Al(OR)_3]$ (where R denotes an alkyl group) produced by the Ziegler process. It is a common industrial material used as a raw material for alumina sol, ceramics binder, antistatic agent for textile products and carpet, water purifier, cosmetics, ointment thickener, alumina catalyst, catalyst carrier, and others. Commercial boehmite in the form of powder is available, for example, from Kaiser Company (U.S.), Vista Chemical Company (U.S.), and Condea Chemie Company (Germany).

In the present invention, the boehmite to be dispersed in water may be used in the form of a powder or a boehmite sol. The amount of the boehmite is usually from 0.1 to 20% by weight, preferably from 0.5 to 10% by weight, based on the total amount of the composition. If the amount of the boehmite is too small, no adequate effect for the improvement in the polishing rate can be expected. On the other hand, if the amount is excessive, the apparent viscosity and the thixotropic properties tend to increase, whereby the dispersion uniformity of alumina tends to be impaired and the handling properties tend to be poor such that it becomes difficult to discharge the polishing composition from the container.

The composition of the present invention comprises water, alumina and chelating agent and, if desired, further contains aluminum salt and, or boehmite. According to the present invention, each of aluminum salt and boehmite, when added into aqueous alumina dispersion in combination with chelating agent, can improve the polishing rate and polishing precision. Though the action of these substance is not clear, it is supposed that the action of each substance is not the same. So preferable compositions are as follows;

A composition comprising water, alumina and chelating agent. A composition comprising water, alumina, chelating agent and aluminum salt. A composition comprising water, alumina, chelating agent, aluminum salt and boehmite. A composition comprising water, alumina, chelating agent and boehmite. The more particularly, preferable embodiments of the composition according to the present invention are as follows;

A composition comprising water, α-alumina and ethylenediaminetetraacetic acid or salt thereof.

A composition comprising water, α-alumina and diethylenetriaminepentaacetic acid or salt thereof.

A composition comprising water, α-alumina, ethylenediaminetetraacetic acid or salt thereof and aluminum sulfate. A composition comprising water, α-alumina, ethylenediaminetetraacetic acid or salt thereof, aluminum sulfate and boehmite. A composition comprising water, α-alumina, ethylenediaminetetra acetic acid or salt thereof and aluminum chloride. A composition comprising water, α-alumina, ethylenediaminetetraacetic acid or salt thereof and boehmite. A composition comprising water, α-alumina, ethylenediaminetetraacetic acid or salt thereof and aluminum nitrate. A composition comprising water, α-alumina, ethylenediaminetetraacetic acid or salt thereof, aluminum nitrate and boehmite. A composition comprising water, α-alumina, diethylenetriaminepentaacetic acid or salt thereof and aluminum sulfate. A composition comprising water, α-alumina, diethylenetriaminepentaacetic acid or salt thereof and boehmite. A composition comprising water, α-alumina, diethylenetriaminepentaacetic acid or salt thereof and aluminum chloride. A composition comprising water, α-alumina, diethylenetriaminepentaacetic acid or salt thereof, aluminum chloride and boehmite, and the like.

The polishing composition of the present invention can be prepared by mixing the above-mentioned component with water. There are no specific restrictions on the order and manner of mixing.

The polishing composition of the present invention may be incorporated with following known additives depending upon the type of the object to be polished or upon the conditions for the polishing operation.

Examples of the additives include water-soluble alcohols such as ethanol, propanol, and ethylene glycol; surface active agent such as sodium alkylbenzenesulfonate, a condensation product of formalin with naphthalenesulfonic acid; acids such as sulfuric acid, hydrochloric acid, nitric acid, and acetic acid; organic polyanionic substances such as lignin sulfonate, carboxymethylcellulose salt, and polyacrylate; celluloses such as cellulose, carboxymethyl cellulose, and hydroxyetnyl cellulose; and inorganic salts such as ammonium sulfate, ammonium chloride, ammonium acetate and magnesium nitrate.

The hydrogen-ion concentration of polishing composition of the present invention is usually pH 1 to 8, preferably pH 2 to 7. In the case where it contains an aluminum salt, pH value is 1 to 6, preferably from 2 to 5, for the adequate solubility of the aluminum salt.

The polishing composition of the present invention may be produced as a stock of high concentration which is diluted at the time of use. The above-mentioned concentration is applied to the polishing composition ready to use.

The polishing composition of the present invention is used for the polishing of metal, glass, and plastics. It is particularly suitable for the polishing of memory hard disk because of its ability to provide a defect-free polished surface.

The invention will be described with reference to the following examples which are not intended to restrict the scope of the invention.

EXAMPLE 1

Preparation of the Polishing Composition

A slurry containing 8 wt% α-alumina was prepared by dispersing α-alumina (having an average particle diameter of 1.5 μm and a maximum particle diameter of 10 μm) into water using a high-speed mixer. The slurry was incorporated with a chelating agent and boehmite in designated amounts as shown in Table 1 to produce the polishing composition of the present invention. The boehmite is Pural ® SCF (having an average particle diameter of 20 μm) available from Condea Chemie.

Polishing Test

Polishing tests were performed on a substrate for 3.5-inch memory hard disk, outer diameter about 95 mm, which is plated with a nickel-phosphorus alloy by electroless plating on an aluminum substrate, having an alloy layer is 90–92% nickel and 10–8% phosphorus.

Polishing was carried out using a double-side polishing machine (with the surface plate having a diameter of 640 mm). The upper and lower surface plates were provided with a suede-type abrasive pad (Domitex 25-0 made by Dai-ichi Lace Co., Ltd.) Five disks were polished for 3 minutes simultaneously. The polishing pressure was 100 g/cm$^2$, the speed of the lower surface plate was 40 rpm, and the polishing composition was supplied at a rate of 100 cc/min. After polishing, the disks were washed and dried, and the average polishing speed was claculated from the weight loss. The polished plates were visually examined for surface defects.

The results of the test are shown in Table 1.

TABLE 1

| Run No. | Chelating agent Kind | Amount (wt %) | Amount of boehmite added (wt %) | Average polishing rate ($\mu$m/min) | Surface defects (scratch) |
|---|---|---|---|---|---|
| 1 | Disodium | 1.0 | 0 | 0.35 | none |
| 2 | ethylene- | 5.0 | 0 | 0.38 | none |
| 3 | diamine-tetraacetate | 1.0 | 3.0 | 0.50 | none |
| 4 | Pentasodium | 1.0 | 0 | 0.38 | none |
| 5 | diethylene- | 5.0 | 0 | 0.40 | none |
| 6 | triamine-pentaacetate | 1.0 | 3.0 | 0.53 | none |
| 7 | none | 0 | 0 | 0.29 | many |
| 8 | none | 0 | 3.0 | 0.36 | none |

EXAMPLE 2

Preparation of the Polishing Composition

A slurry containing 8 wt % α-alumina was prepared by dispersing α-alumina (having an average particle diameter of 1.5 $\mu$m and a maximum particle diameter of 10 $\mu$m) into water using a high-speed mixer. The slurry was incorporated with a chelating agent and an aluminum salt in designated amounts as shown in Table 2 to produce the polishing composition of the present invention.

Polishing Test

Polishing test was carried out in the same manner as in Example 1 except that the polishing pad was replaced by a harder one (Domitex 25-6, made by Dai-ichi Lace Co., Ltd.).

The results of the test are shown in Table 2.

TABLE 2

| Run No. | Chelating agent Kind | (wt %) | Kind | (wt %) | Average polishing rate ($\mu$m/min.) | Surface defects (scratch) |
|---|---|---|---|---|---|---|
| 1 | Disodium ethylene-diaminetetra-acetate | 1.0 | none | 0 | 0.61 | none |
| 2 | Disodium ethylene-diaminetetra-acetate | 1.0 | Aluminum sulfate | 1.0 | 0.92 | none |
| 3 | | | Aluminum sulfate | 3.0 | 1.05 | none |
| 4 | | | Aluminum chloride | 3.0 | 0.95 | none |
| 5 | Pentasodium diethylene-triamine-pentaacetate | 1.0 | Aluminum sulfate | 3.0 | 1.25 | none |

What is claimed is;

1. A polishing composition comprising water, alumina as abrasive particles, and a chelating agent, wherein the alumina is present in an amount of from 2 to 30% by weight, based on the total amount of the composition and the chelating agent is selected from the group consisting of polyaminocarboxylic acid, and sodium and potassium salt thereof.

2. The composition according to claim 1, which further contains an aluminum salt.

3. The composition according to claim 1, which further contains boehmite.

4. The composition according to claim 2, which further contains boehmite.

5. The composition according to claim 1, wherein the chelating agent is present in an amount of from 0.01 to 20% by weight, based on the total amount of the composition.

6. The composition according to claim 2, wherein the aluminum salt is present in an amount of from 0.01 to 20% by weight based on the total amount of the composition.

7. The composition according to claim 3 or 4, wherein the boehmite is present in an amount of from 0.1 to 20% by weight, based on the total amount of the composition.

8. The composition according to claim 1, wherein the polyaminocarboxylic acid is ethylenediaminetetraacetic acid.

9. The composition according to claim 1, wherein the polyaminocaboxylic acid is diethylenetriaminepentaacetic acid.

10. The composition according to claim 2, wherein the aluminum salt is selected from the group consisting of aluminum sulfate, aluminum chloride, aluminum nitrate, aluminum hydrogen phosphate and aluminum bromide.

11. The composition according to claim 1, wherein the alumina is present in an amount of from 2 to 15% by weight based on the total amount of the composition.

12. The composition according to claim 1, wherein the chelating agent is sodium or potassium salt of polyaminocarboxylic acid.

13. The composition according to claim 12, wherein the polyaminocarboxylic acid is ethylenediaminetetraacetic acid.

14. The composition according to claim 12, wherein the polyaminocarboxylic acid is diethylenetriaminepentaacetic acid.